United States Patent [19]
Kwak et al.

[11] Patent Number: 6,137,913
[45] Date of Patent: Oct. 24, 2000

[54] METHOD FOR SEGMENTING MOVING PICTURE OBJECTS BY CONTOUR TRACKING

[75] Inventors: Jin Suk Kwak; Myoung Ho Lee; Mun Chul Kim; Chie Teuk Ahn; Jin Woong Kim; Jae Gark Choi, all of Daejeon, Rep. of Korea

[73] Assignee: Electronics and Telecommunications Research Institute, Daejeon, Rep. of Korea

[21] Appl. No.: 09/169,018

[22] Filed: Oct. 8, 1998

[30] Foreign Application Priority Data

Aug. 5, 1998 [KR] Rep. of Korea ............ 98/31935

[51] Int. Cl.$^7$ ............................................. G06K 9/36
[52] U.S. Cl. ................... 382/236; 382/173; 382/190; 382/242
[58] Field of Search .................... 382/236, 173, 382/242, 190, 282

[56] References Cited

U.S. PATENT DOCUMENTS

| 5,109,435 | 4/1992 | Lo et al. ......................... 382/48 |
| 5,631,975 | 5/1997 | Riglet et al. .................... 382/173 |
| 6,026,183 | 2/2000 | Talluri et al. ................... 382/194 |
| 6,031,935 | 2/2000 | Kimmel .......................... 382/173 |

OTHER PUBLICATIONS

Luc Vincent et al. "Watersheds in Digital Spaces: An Efficient Algorithm Based on Immersion Simulations", IEEE Transactions on Pattern Analysis and Machine Intelligence, vol. 13, No. 6, Jun. 1991, pp. 583–595.

F. Meyer et al. "Morphological Segmentation", Journal of Visual Communication and Image Representation, vol. 1 No. 1, Sep. 1990, pp. 21–46.

Philippe Salembier et al., "Hierarchical Morphological Segmentation for Image Sequence Coding", IEEE Transactions on Image Processing, vol. 3, No. 5, Sep. 1994, pp. 639–651.

*Primary Examiner*—Jose L. Couso
*Assistant Examiner*—Anh Hong Do
*Attorney, Agent, or Firm*—Cohen, Pontani, Lieberman & Pavane

[57] ABSTRACT

It is an object of the present invention to provide a method for automatically segmenting image objects by applying contour tracking to image objects with segmentation information of previous image object, and according to an aspect of the present invention, there is provided a method for segmenting an image object of a moving picture including the steps of: extracting and storing a contour of a previous image object of a previous scene by using a predetermined segmentation information of the previous image object; calculating a motion information by extracting a contour of the previous image object at a current scene; extracting a contour of a current image object by using the motion information and a space domain information of previous and current scenes; and extracting an image object area of the current image object at the current scene by using the contour of the current image object.

9 Claims, 4 Drawing Sheets

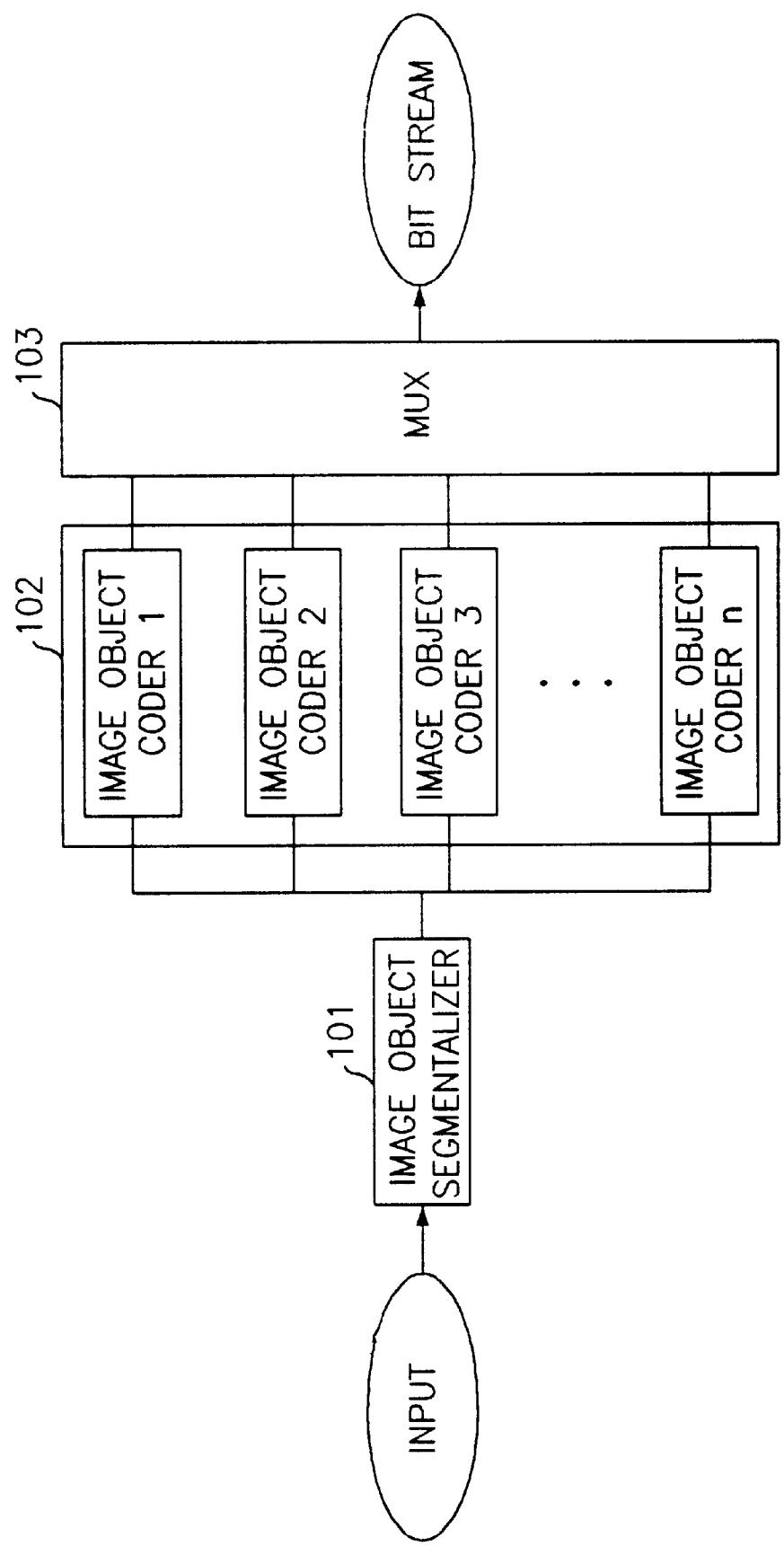

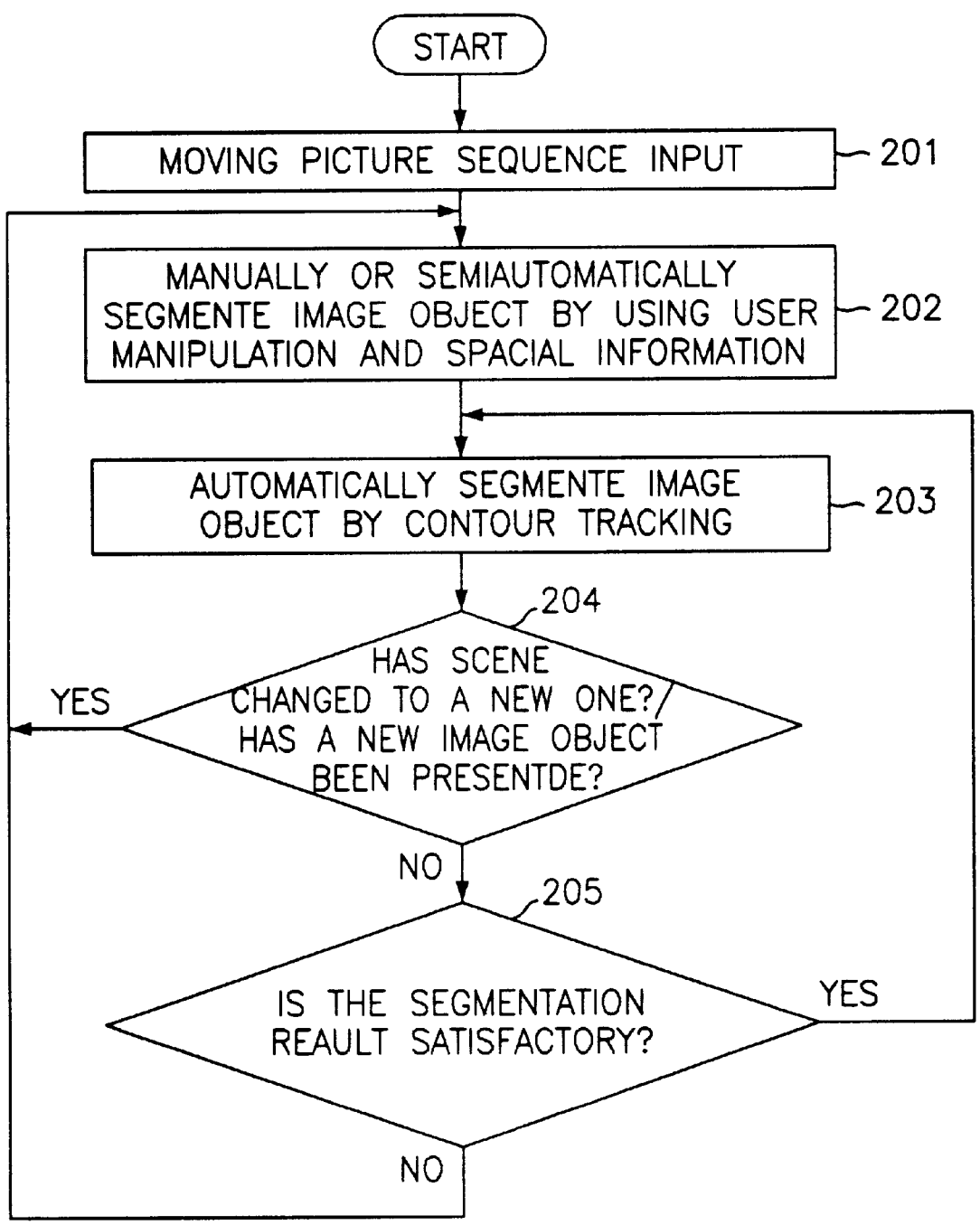

METHOD FOR SEGMENTING MOVING PICTURE OBJECTS BY CONTOUR TRACKING

FIELD OF THE INVENTION

The present invention relates to a method for segmenting moving picture objects, particularly to a method for segmenting moving picture objects by contour tracking which automatically segments next image object using segmentation information of previous image object.

BACKGROUND OF THE INVENTION

Conventional methods for image object segmentation include automatic segmentation, manual segmentation and semiautomatic segmentation. As for the automatic segmentation, image objects are automatically segmented according to the variations in luminance of successive images. As for the manual segmentation, a user directly segments each of image frames using image editing tools. And as for semiautomatic segmentation, the first image object is segmented manually and then the rest of image objects are segmented automatically.

However, the performance of the automatic segmentation is varied in a wide range due to threshold values to detect the luminance variations in successive images. And the manual segmentation requires too much of time and cost to segment each frame manually. Further, the conventional semiautomatic segmentation does not use information of previously segmented images in automatic segmentation for the rest of image objects.

SUMMARY OF THE INVENTION

Therefore, the present invention has been made in view of the above mentioned problem, it is an object of the present invention to provide a method for automatically segmenting image objects by applying contour tracking to image objects with segmentation information of previous image object.

According to an aspect of the present invention, there is provided a method for segmenting an image object of a moving picture including the steps of: extracting and storing a contour of a previous image object of a previous scene by using a predetermined segmentation information of the previous image object; calculating a motion information by extracting a contour of the previous image object at a current scene; extracting a contour of a current image object by using the motion information and a space domain information of previous and current scenes; and extracting an image object area of the current image object at the current scene by using the contour of the current image object.

BRIEF DESCRIPTION OF THE DRAWINGS

A further understanding of the nature and advantage of the present invention will become apparent by reference to the remaining portions of the specification and drawings, in which:

FIGS. 1a and 1b are block diagrams of an object based image coding and decoding system to which an embodiment of the present invention is applied; and FIG. 2 is a flow chart which shows a method for semi-automatically segmenting an image object by user manipulation and image contour tracking.

DETAILED DESCRIPTION OF THE PREFERRED EMBODIMENT

A detailed description of an embodiment according to the present invention will be given below with reference to the attached drawings.

Figure 1B:
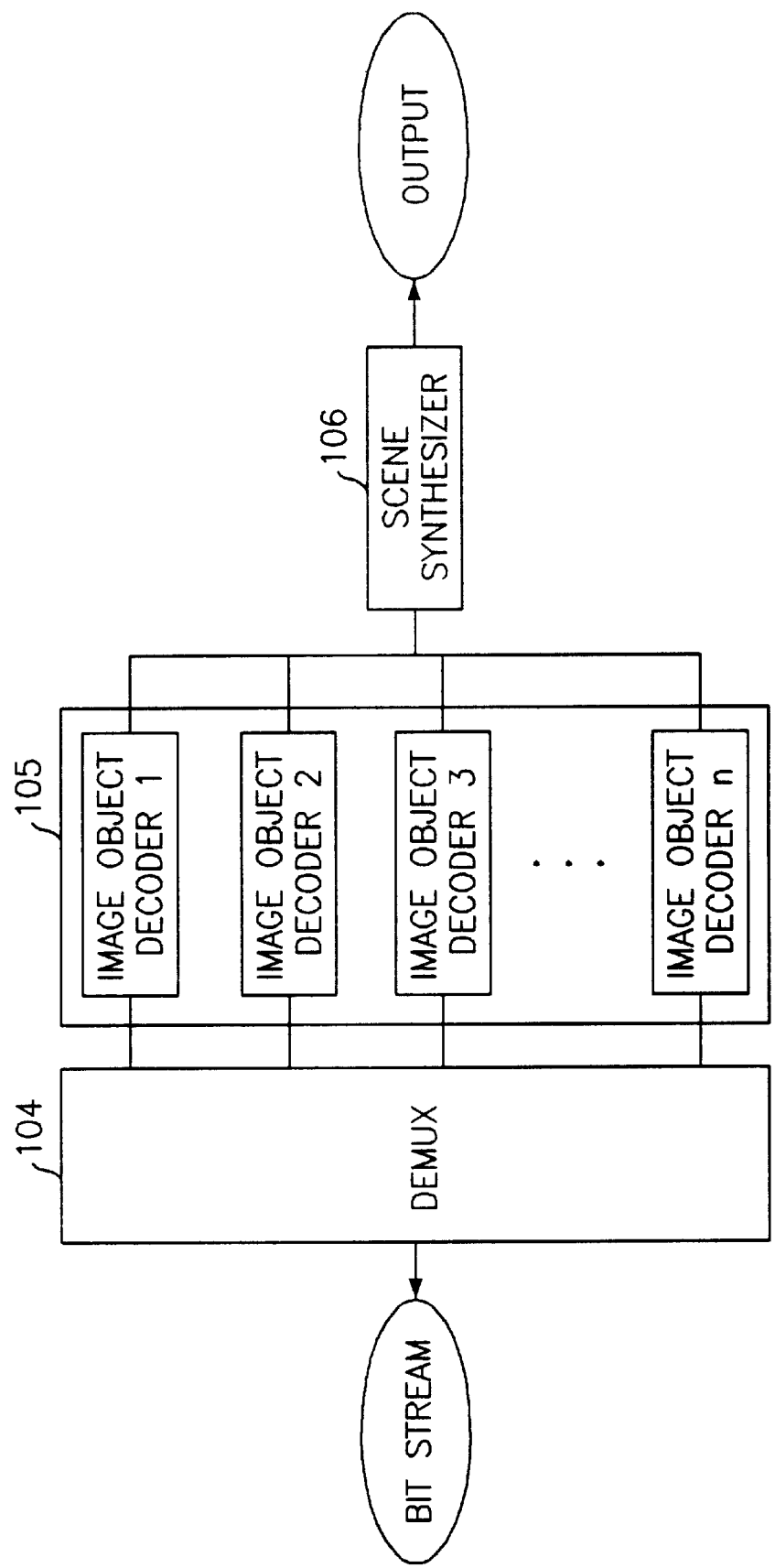

Now referring to FIGS. 1a and 1b, FIGS. 1a and 1b are block diagrams of an object based image coding and decoding system to which an embodiment of the present invention is applied. As shown in FIG. 1a, the externally inputted image frames are segmented into image objects by user manipulation and contour tracking of image objects in a image object segmentalizer 101. The each of the segmented image objects is coded by each of the MPEG-4 image coders 102 and reduced image object data are generated. The reduced image object data are multiplexed by the multiplexer 103 according to MPEG-4 multiplexing standard and then transferred or stored in the form of a bit stream.

Now, referring to FIG. 1b, the image object data in the form of coded and multiplexed data stream are decoded by the object based image decoding system shown in FIG. 1b. In detail, the image object data is demultiplexed into image objects by the demultiplexer 104. Each of the demultiplexed image objects is decoded by each of the image decoders 105. The decoded image objects are synthesized by the scene synthesizer 106 and outputted on a display.

FIG. 2 is a flow chart which shows a method for semi-automatically segmenting an image object by user manipulation and image contour tracking. As shown in FIG. 2, when a moving picture sequence is inputted at step 201, the first image object presented at the first scene in the sequence or a first new image object of the next successive scene in the sequence is manually or semiautomatically segmented by the user manipulation and the spacial information, such as luminance and color, at step 202. Then, at step 203, the image object of the current scene is automatically segmented by using the segmentation information and contour tracking of the image object.

After completing the segmentation process, at step 204, it is determined whether the scene has changed to a new one or whether a new image object has been presented. If the result is positive, the process is continued at step 202 in which the new image object is manually or semiautomatically segmented by the user manipulation and the spacial information. On the contrary, if the result is negative, it is determined at step 205 whether the segmentation result is satisfactory or not. If the result is satisfactory, then the step 203 is performed. And if the result is not satisfactory, then the step 202 is performed.

Figure 3:
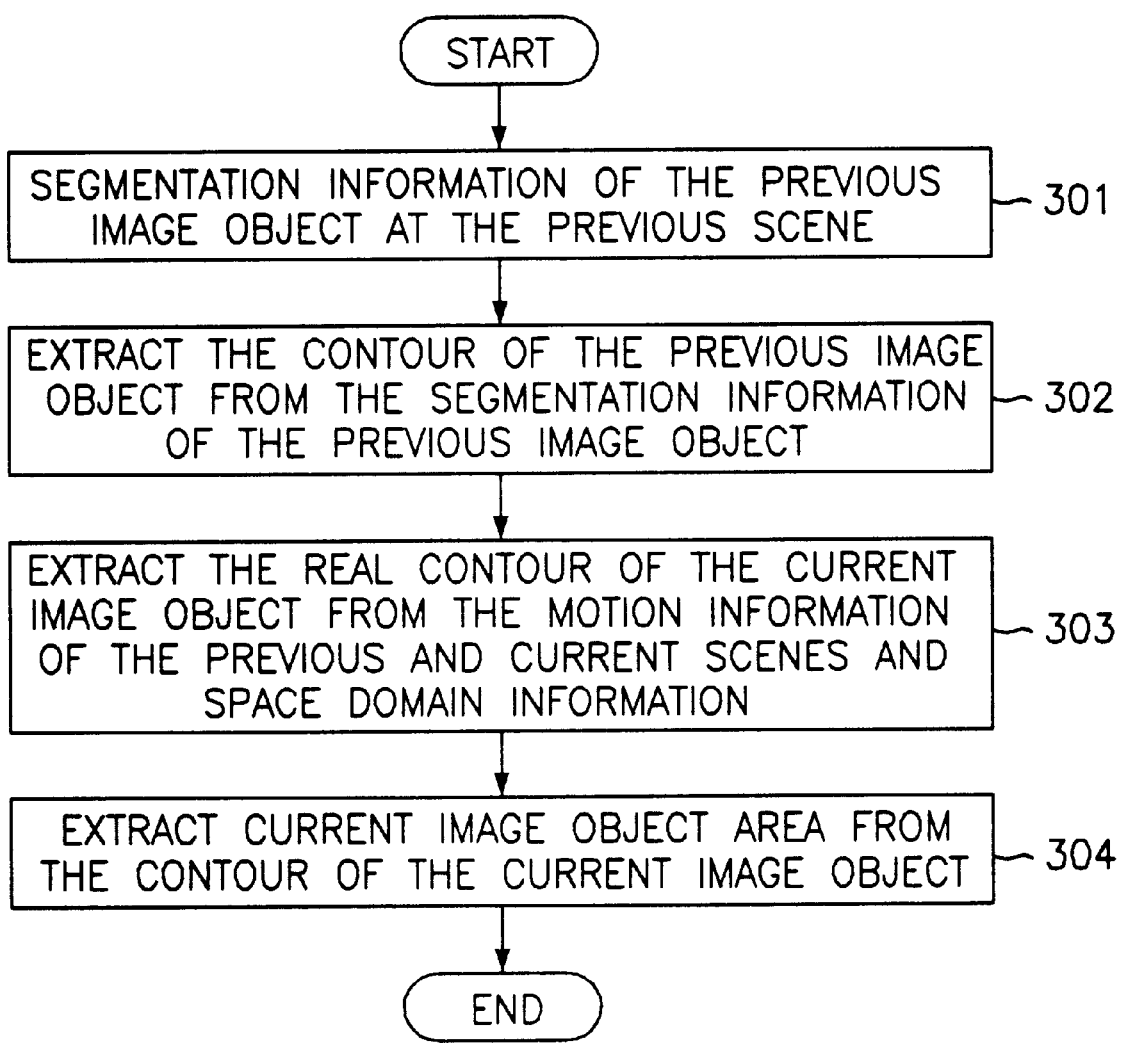
FIG. 3 is a flow chart which shows a method for segmenting an image object by image contour tracking used in the method of FIG. 2.

FIG. 3 is a flow chart which shows the process for segmenting an image object by image contour tracking used in the semiautomatic image object segmentation of FIG. 2. As shown in FIG. 3, the process starts at step 301 by inputting the segmentation information of the previously presented image object of the previous scene. The contour of the previous image object is extracted from the inputted segmentation information of the previous image object at step 302. At this step, the points consisting of the image contour ("contour points") are stored in order. It is noted that the starting point and the ending point of contour points are identical.

At step 303, the contour of a current image object of a current scene is extracted by using the stored motion information of the previous image object, the motion information of the previous and current scene and the space domain information. The process of step 303 is described in detail, hereinafter. First, a time domain information, or motion information of the contour of previous image object at the current scene is calculated. The motion information is calculated by detecting the location of contour points at the current scene in comparison with the location of those at the previous scene. Here, all of the contour points stored at step 302 or some of the contour points selected based on partial characteristics of the contour are used to calculate the motion information by the following equations;

$$MAD(u, v) = \sum_{i=-M/2}^{M/2-1} \sum_{j=-N/2}^{N/2-1} |S(i+u, j+v) - R(i, j)|\alpha(i, j) \quad (1)$$

$$MV = (u, v)|_{minMAD(u,v)}, \quad -p \le u, \quad v \le p, \quad (2)$$

where

MAD is the difference in pixel value between current and previous scene;

MV(motion vector) is the minimum value of MAD representing the motion information;

R(i, j) is a pixel value at the location (i, j) of the previous scene determined by the combination of color values of (red, green, blue);

S(i+u, j+v) is a pixel value at the location (i+u, j+v) of the current scene determined by the combination of color values of (red, green, blue);

α(i, j) is a weight value according to the inclusion of object area and the color value;

M and N are sizes of blocks for weighted polygon matching; and p is unidirectional search range.

If α(i, j) is 1 for all i and j, it is called as "block matching method". If a(i, j) is 1 when R(i, j) is included in the object area and α(i, j) is 0 when R(i, j) is not included in the object area, it is called as "polygon matching method". Conventionally, α(i, j) can only have 0 or 1. According to the present invention, however, α(i, j) can have random values. To sum up, it is determined by the equation (1) if the method for calculating motion information is either block matching method or polygon matching method, and the minimum value of the motion information is determined by the equation (2) which calculates the minimum value of the equation (1).

Then, the real contour of the current image object is extracted by using the motion information of the contour calculated as described above and the spacial information of previous or current scene. The motion information is determined by using motion compensation error or the difference of current and previous scenes and the spacial information includes edge intensity at each of the candidate locations.

Then, at step 304, the current image object area is extracted by using the contour information of the current image object extracted at step 303. The process of step 304 is described in detail, hereinafter. First, an interpolation method is used to generate a continuous contour of the current image object because the contour information extracted at step 303 may have discontinuous portions of the contour. Then, the internal area defined by the continuous contour is assigned to a unique label, so that the current image object area is extracted and stored as a separate segmentation mask.

Finally, a median filtering is applied to the final segmentation mask representing the current image object area in order to enhance visual performances by smoothing the contour of the image object.

As described above, according to the present invention, since the image object is automatically segmented by using the segmentation information of the previous image object, it is possible to reduce the cost and time for segmenting the whole image objects. Further, the present invention is applicable to various technical field including moving picture editing and authoring, image synthesizing by chroma key and object based image coding.

Although the preferred embodiment of the present invention has been disclosed for illustrative purposes, those skilled in the art will appreciate that various modifications, additions and substitutions are possible, without departing from the scope and the spirit of the present invention as disclosed in the accompanying claims.

What is claimed is:

1. A method for segmenting an image object of a moving picture comprising the steps of:

extracting and storing a contour of a previous image object of a previous scene by using predetermined segmentation information of said previous image object;

calculating motion information by extracting a contour of said previous image object at a current scene;

extracting a contour of a current image object by using said motion information and space domain information of previous and current scenes; and extracting an image object area of said current image object at said current scene by using said contour of said current image object.

2. The method as claimed in claim 1, wherein said predetermined segmentation information of said previous image object is externally provided.

3. The method as claimed in claim 1, wherein said contour includes a plurality of contour points, the first and the last points of said contour points being identical.

4. The method as claimed in claim 1, wherein said motion information is determined by equations;

$$MAD(u, v) = \sum_{i=-M/2}^{M/2-1} \sum_{j=-N/2}^{N/2-1} |S(i+u, j+v) - R(i, j)|\alpha(i, j)$$

$$MV = (u, v)|_{minMAD(u,v)}, \quad -p \le u, \quad v \le p$$

where

MAD is a difference in pixel value between said current and previous scenes;

MV (motion vector) is a minimum value of MAD representing said motion information;

R (i, j) is a pixel value at a location (i, j) of said previous scene determined by a combination of color values of red, green, blue;

S(i+u, j+v) is a pixel value at a location (i+u, j+v) of said current scene determined by the combination of color values of red, green blue;

α(i, j) is a weight value according to inclusion of object area and the color value;

M and N are sizes of blocks for weighted polygon matching; and p is a unidirectional search range.

5. The method as claimed in claim 1, wherein said motion informatin is extracted by using motion compensation error.

6. The method as claimed in claim 1, wherein said motion information is extracted by using a difference of said current and previous scenes.

7. The method as claimed in claim 1, wherein said space domain information is extracted by using an edge intensity for each candidate location.

8. The method as claimed in claim 1, wherein said step for retracting an image object area of said current image object further comprises the steps of:

generating a continuous contour of said current image object by an interpolation method;

assigning an internal area defined by said continuous contour to a unique label; and storing said current image object area as a separate segmentation mask of said current image object.

9. The method as claimed in claim 8, further comprising the step of:

performing a median filtering to said segmentation mask.

* * * * *